United States Patent
Nguyen et al.

(10) Patent No.: US 7,543,089 B2
(45) Date of Patent: Jun. 2, 2009

(54) ADAPTIVE INPUT/OUTPUT BUS SHARING METHOD TO IMPROVE PERFORMANCE OF SCSI/SAS CLUSTERS

(75) Inventors: Nam V. Nguyen, Round Rock, TX (US); Ananda Chinnaiah Sankaran, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 11/186,529

(22) Filed: Jul. 21, 2005

(65) Prior Publication Data

US 2007/0022189 A1    Jan. 25, 2007

(51) Int. Cl.
G06F 5/00 (2006.01)
G06F 9/46 (2006.01)

(52) U.S. Cl. .................................. 710/60; 718/105
(58) Field of Classification Search ............. 710/60; 718/105
See application file for complete search history.

(56) References Cited

U.S. PATENT DOCUMENTS 5,937,428 A * 8/1999 Jantz ........................ 711/114
7,203,846 B2 * 4/2007 Bresniker et al. ............ 713/300
2005/0172097 A1 * 8/2005 Voigt et al. ................. 711/170

* cited by examiner

*Primary Examiner*—Henry W. H. Tsai
*Assistant Examiner*—Juanito C Borromeo
(74) *Attorney, Agent, or Firm*—Baker Botts L.L.P.

(57) ABSTRACT

According to various illustrative embodiments of the present invention, a method for adaptive cluster input/output control includes starting a nonessential input/output operation using a first controller in a first node of a cluster, informing at least a second controller in a second node of the cluster about starting the nonessential input/output operation, and increasing the nonessential input/output operation by a predetermined utilization percentage. The method also includes waiting for a predetermined amount of time, determining whether the nonessential input/output operation has been completed, and determining whether the at least the second controller in the second node has substantially decreased performance. The method also includes decreasing the nonessential input/output operation by the predetermined utilization percentage if the nonessential input/output operation utilization percentage is greater than the predetermined utilization percentage and if the at least the second controller in the second node has substantially decreased performance, and informing the at least the second controller in the second node of the cluster about the completion of the nonessential input/output operation if the nonessential input/output operation has been completed.

19 Claims, 8 Drawing Sheets

ADAPTIVE INPUT/OUTPUT BUS SHARING METHOD TO IMPROVE PERFORMANCE OF SCSI/SAS CLUSTERS

TECHNICAL FIELD OF THE INVENTION

This invention relates generally to information handling systems and, more particularly, to a method for adaptive input/output (I/O) bus sharing to improve the performance of small computer system interface (SCSI) system and/or a serial attached SCSI (SAS) clusters.

BACKGROUND OF THE INVENTION

As the value and use of information continues to increase, individuals and businesses continually seek additional ways to process and store information. One option available to users of information is an information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems, such as computers, including servers and workstations, are often grouped in clusters to perform specific tasks. A server cluster is a group of independent servers that is managed as a single system and is characterized by higher availability, manageability, and scalability, as compared with groupings of unmanaged servers. A server cluster typically involves the configuration of a group of independent servers such that the servers appear in the network as a single machine or unit. Server clusters are often managed as a single system, share a common namespace on the network, and are designed specifically to tolerate component failures and to support the addition or subtraction of components in the cluster in a transparent manner. At a minimum, a server cluster includes two or more servers that are connected to one another by a network. The server cluster may include software driven methods by which each client of the server cluster may access the data stored in or controlled by a server of the server cluster. One software application that is used to manage the operation of a server cluster is Microsoft Cluster Service (MSCS), which is produced by the Microsoft Corporation of Redmond, Wash.

In some server cluster configurations, many components of the server cluster are redundant, allowing the component to be replaced or upgraded while the server cluster is online in the network and without affecting the operations and/or services provided by the server cluster to the clients on the network. Server clusters often include a shared storage element in which each drive of shared storage is accessible by each node, or server, of the server cluster. From time to time, the firmware associated with the storage drives comprising the shared storage must be updated. The process of updating the firmware of a storage drive may involve taking the storage drive down or offline and updating the firmware. This step may be followed by a reboot of the storage drive in which the storage drive is placed back in service in the shared storage of the server cluster.

The shared storage of the server cluster may include fault tolerant data storage. One example of fault tolerant data storage is a redundant array of independent disks (RAID) storage system. RAID storage systems combine multiple disks into an array of disk drives to obtain performance, capacity, and reliability advantages. RAID Level 5 is an example of a fault tolerant data storage system. A RAID Level 5 storage system is characterized by the striping of data across the disks of the storage system. A set of parity bits generated by an exclusive-OR of the striped data bits is stored on a disk that is separate from the striped data. The parity bits for the respective stripes of data are distributed in the disks of the storage system so that each disk will likely contain both data bits for a stripe of data and parity bits related to some other stripe of data. In a RAID Level 5 storage system, it is typical that no single disk includes all of the parity bits or all of the data bits. RAID Level 5 is often referred to as a rotating parity storage system. If a disk of a RAID Level 5 storage system fails, the data (including the data bits and/or the parity bits) can be rebuilt by performing an exclusive-OR operation with the data of the other disks in the stripe, including the parity bits associated with the data stripe. Other RAID levels may be implemented for fault tolerance, including RAID 10, RAID 1, RAID 3, RAID 6, and the like, for example.

Storage systems based on peripheral component interconnect (PCI) RAID controllers, for example, PERC with PV220xS available from Dell, Inc., are common. Generically, these RAID controllers are server host based and connected to a JBOD (just a bunch of disks) enclosure. In such storage architectures, there are several operations that should be performed by the RAID controller when the storage device is not very busy. Examples of such operations include background initialization, read patrol, rebuild, and/or read cache. Within the RAID controller firmware, these nonessential input/output (I/O) operations (NEIs) are usually scheduled with lower priority than regular input/output (I/O) operations. However, in the cluster environment, where two or more server nodes with their RAID controllers are attached to the same storage, sometimes these nonessential input/output (I/O) operations (NEIs) from one server node can affect more useful input/output (I/O) operations being performed on other nodes sharing the same bus.

Consider a conventional 2-node cluster 1100 based on SCSI, Fibre Channel, SAS, or any applicable technology, with the conventional 2-node cluster 1100 as shown in FIG. 11, for example, with cluster node (or server) A 1110 and cluster node (or server) B 1120. The cluster node B 1120 can be very busy accessing a logical unit number (LUN) of a storage system subunit 1130, such as a production LUN 1140, as indicated by arrows 1125, while the cluster node A 1110 may be very idle. The controller firmware on the cluster node A 1110 can kick off low priority nonessential input/output (I/O) operations (NEIs) with 100% utilization, such as by accessing an LUN requiring maintenance 1150 of the storage system subunit 1130, as indicated by arrows 1115, for example. However, these low priority NEIs 1115 with 100% utilization can seriously affect the regular input/output (I/O) operations 1125 from the cluster node B 1120. For example, business applications on the cluster node B 1120 would incur long input/output (I/O) response times and the connected clients, in turn, would see unnecessarily slow server response. In such a scenario, the conventional 2-node cluster 1100 performance may be degraded.

With clustering storage solutions becoming more popular, there is a need for the controller to be able to determine the amount of NEIs that should be sent to the shared storage system in the cluster environment without adversely affecting the overall performance of the cluster. In a standalone environment, the RAID controller, for example, can currently examine its own queue to determine if it is busy or not. However, there is no mechanism for the RAID controller to determine the storage utilization for an entire cluster configuration including more than one server sharing the same storage system.

SUMMARY OF THE INVENTION

According to various illustrative embodiments of the present invention, a method for adaptive cluster input/output control includes starting a nonessential input/output operation using a first controller in a first node of a cluster, informing at least a second controller in a second node of the cluster about starting the nonessential input/output operation, and increasing the nonessential input/output operation by a predetermined utilization percentage. The method also includes waiting for a predetermined amount of time, determining whether the nonessential input/output operation has been completed, and determining whether the at least the second controller in the second node has substantially decreased performance. The method also includes decreasing the nonessential input/output operation by the predetermined utilization percentage if the nonessential input/output operation utilization percentage is greater than the predetermined utilization percentage and if the at least the second controller in the second node has substantially decreased performance, and informing the at least the second controller in the second node of the cluster about the completion of the nonessential input/output operation if the nonessential input/output operation has been completed.

The system and method disclosed herein are advantageous in providing a mechanism by which peer storage controllers on cluster servers may communicate with each other to minimize substantially the affect of maintenance input/output (I/O) operations on the overall cluster performance. The system and method disclosed herein are further advantageous in that this mechanism by which peer storage controllers on cluster servers may communicate with each other to minimize substantially the affect of maintenance input/output (I/O) operations on the overall cluster performance may be readily scalable and made applicable to many other and different types of applications. For example, regular and/or host input/output (I/O) operations may be prioritized within a host and/or across multiple hosts in the cluster.

The system and method disclosed herein are still further advantageous in improving the performance of business critical applications deployed on clustering systems and, hence, in improving the user and/or customer experience. Other technical advantages will be apparent to those of ordinary skill in the art having the benefit of the present disclosure and in view of the following specification, claims, and drawings.

BRIEF DESCRIPTION OF THE DRAWINGS

The following figures form part of the present specification and are included to further demonstrate certain aspects of the present invention, and should not be used to limit or define the present invention. The present invention may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein.

It is to be noted, however, that the appended drawings illustrate only typical embodiments of the present invention and are, therefore, not to be considered limiting of the scope of the present invention, as the present invention may admit to other equally effective embodiments.

DETAILED DESCRIPTION OF EXEMPLARY EMBODIMENTS OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
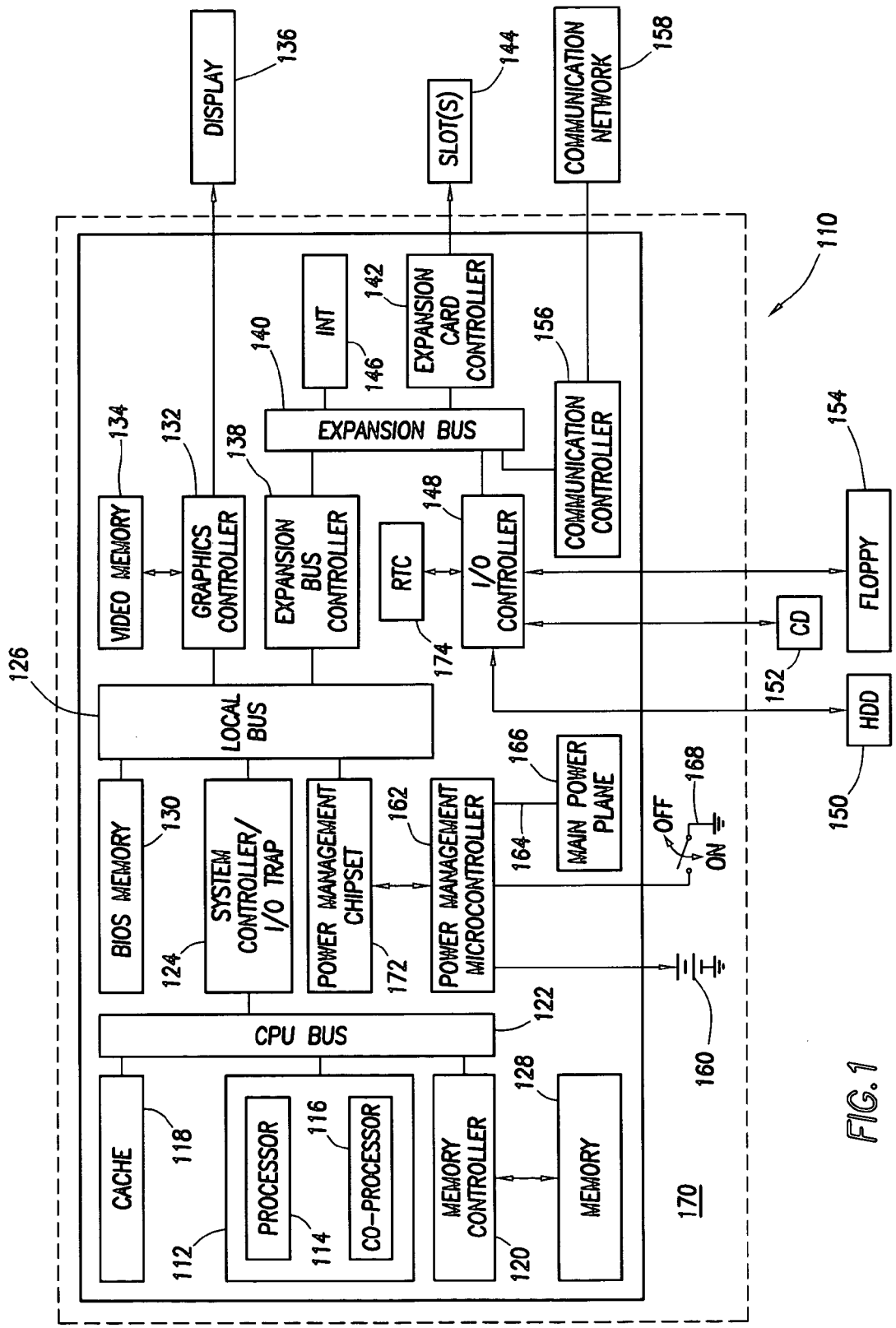
FIG. 1 schematically illustrates a block diagram showing an information handling system, according to teachings of the present disclosure.

Referring first to FIG. 1, a block diagram of an information handling system 110 is shown, according to teachings of the present disclosure. The information handling system 110 or the computer system 110 preferably may include at least one microprocessor or central processing unit (CPU) 112. The CPU 112 may include a processor 114 for handling integer operations and a co-processor 116 for handling floating point operations. The CPU 112 may preferably be coupled to a cache 118 and a memory controller 120 via a CPU bus 122. A system controller input/output (I/O) trap 124 preferably may couple the CPU bus 122 to a local bus 126 and may be generally characterized as part of a system controller.

A main memory 128 of dynamic random access memory (DRAM) modules may preferably be coupled to the CPU bus 122 by the memory controller 120. The main memory 128 may be divided into one or more areas such as a system management mode (SMM) memory area (not expressly shown).

A basic input/output system (BIOS) memory 130 may also preferably be coupled to the local bus 126. A FLASH memory or other nonvolatile memory may be used as the BIOS memory 130. A BIOS program (not expressly shown) may typically be stored in the BIOS memory 130. The BIOS program preferably may include software that facilitates interaction with and between the information handling system 110 devices such as a keyboard (not expressly shown), a mouse (not expressly shown), and/or one or more I/O devices. The BIOS memory 130 may also store system code (note expressly shown) operable to control a plurality of basic information handling system 110 operations.

A graphics controller 132 may preferably be coupled to the local bus 126 and to a video memory 134. The video memory 134 may preferably be operable to store information to be displayed on one or more display panels 136. The display panel 136 may be an active matrix or passive matrix liquid crystal display (LCD), a cathode ray tube (CRT) display, and/or another display technology. In selected applications, uses and/or instances, the graphics controller 132 may also be coupled to an integrated display, such as in a portable information handling system implementation.

A bus interface controller or expansion bus controller 138 may preferably couple the local bus 126 to an expansion bus 140. In various illustrative embodiments, the expansion bus 140 may be configured as an industry standard architecture (ISA) bus. Other buses, for example, a peripheral component interconnect (PCI) bus, may also be used.

In certain information handling system 110 embodiments, an expansion card controller 142 may also be included and may preferably be coupled to the expansion bus 140 as shown in FIG. 1. The expansion card controller 142 may preferably be coupled to a plurality of information handling system 110 expansion slots 144. The expansion slots 144 may be configured to receive one or more computer components (not expressly shown) such as an expansion card (e.g., modems, fax cards, communications cards, and/or other I/O devices).

An interrupt request generator 146 may also preferably be coupled to the expansion bus 140. The interrupt request generator 146 may preferably be operable to issue an interrupt service request over a predetermined interrupt request line in response to receipt of a request to issue an interrupt instruction from the CPU 112.

An I/O controller 148, often referred to as a super I/O controller 148, may also preferably be coupled to the expansion bus 140. The I/O controller 148 may preferably interface to an integrated drive electronics (IDE) hard drive device (HDD) 150, a compact disk-read only memory (CD-ROM) drive 152, and/or a floppy disk drive (FDD) 154. Other disk drive devices (not expressly shown) that may be interfaced to the I/O controller 148 include a removable hard drive, a zip drive, a CD-RW (compact disk-read/write) drive, and a CD-DVD (compact disk-digital versatile disk) drive.

A communication controller 156 may preferably be provided and may enable the information handling system 110 to communicate with a communication network 158, for example, an Ethernet network. The communication network 158 may include a local area network (LAN), a wide area network (WAN), the Internet, an Intranet, wireless broadband, and the like. The communication controller 156 may be employed to form a network interface for communicating with other information handling systems (not expressly shown) coupled to the communication network 158.

As shown in FIG. 1, the information handling system 110 may preferably include a power supply 160, which may provide power to the many components and/or devices that form the information handling system 110. The power supply 160 may be a rechargeable battery, such as a nickel metal hydride (NiMH) or a lithium ion battery, when the information handling system 110 is embodied as a portable or notebook computer, an A/C (alternating current) power source, an uninterruptible power supply (UPS) or other power source.

The power supply 160 may preferably be coupled to a power management microcontroller 162. The power management microcontroller 162 may preferably control the distribution of power from the power supply 160. More specifically, the power management microcontroller 162 may preferably include a power output 164 coupled to a main power plane 166 that may supply power to the CPU 112 as well as to other information handling system 110 components. The power management microcontroller 162 may also be coupled to a power plane (not expressly shown) operable to supply power to an integrated panel display (not expressly shown), as well as to additional power delivery planes that preferably may be included in the information handling system 110.

The power management microcontroller 162 may preferably monitor a charge level of an attached battery and/or a UPS to determine when and when not to charge the battery or the UPS. The power management microcontroller 162 may preferably also be coupled to a main power switch 168, which the user may actuate to turn the information handling system 110 on and off. While the power management microcontroller 162 may power down one or more portions or components of the information handling system 110, for example, the CPU 112, the display 136, and/or the HDD 150, and the like, when not in use to conserve power, the power management microcontroller 162 itself may preferably be substantially always coupled to a source of power, preferably the power supply 160.

A computer system, a type of information handling system 110, may also include a power management chip set 172. The power management chip set 172 may preferably be coupled to the CPU 112 via the local bus 126 so that the power management chip set 172 may receive power management and control commands from the CPU 112. The power management chip set 172 may preferably be connected to a plurality of individual power planes operable to supply power to respective components of the information handling system 110, for example, the HDD 150, the FDD 154, and the like. In this manner, the power management chip set 172 may preferably act under the direction of the CPU 112 to control the power supplied to the various power planes and components of a system.

A real-time clock (RTC) 174 may also be coupled to the I/O controller 148 and the power management chip set 172. Inclusion of the real-time clock (RTC) 174 may permit timed events and/or alarms to be transmitted to the power management chip set 172. The real-time clock (RTC) 174 may be programmed to generate an alarm signal at a predetermined time as well as to perform other operations.

The information handling system 110 may be associated with a chassis 170. Generally, the chassis 170 may be referred to as the computer case and/or case that encloses the some of the components within the information handling system 110. However, other components such as the CD drive 152, the floppy drive 154 and/or the HDD 150, may be placed internal to the chassis 170 and/or separately from the chassis 170 in a stand-alone enclosure (described below in more detail) and/or connected in series.

Figure 2:
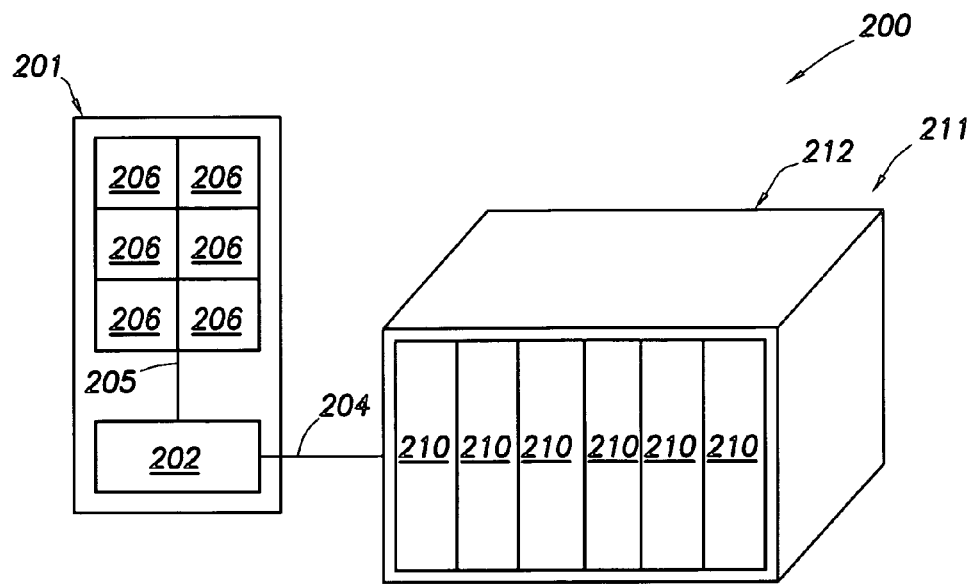
FIG. 2 schematically illustrates a block diagram showing an exemplary embodiment of a storage system including a controller mounted on an internal backplane having hard disk drives (HDD) and a stand-alone enclosure coupled to the controller having additional HDD connected via a SCSI bus, according to teachings of the present disclosure.
Figure 3:
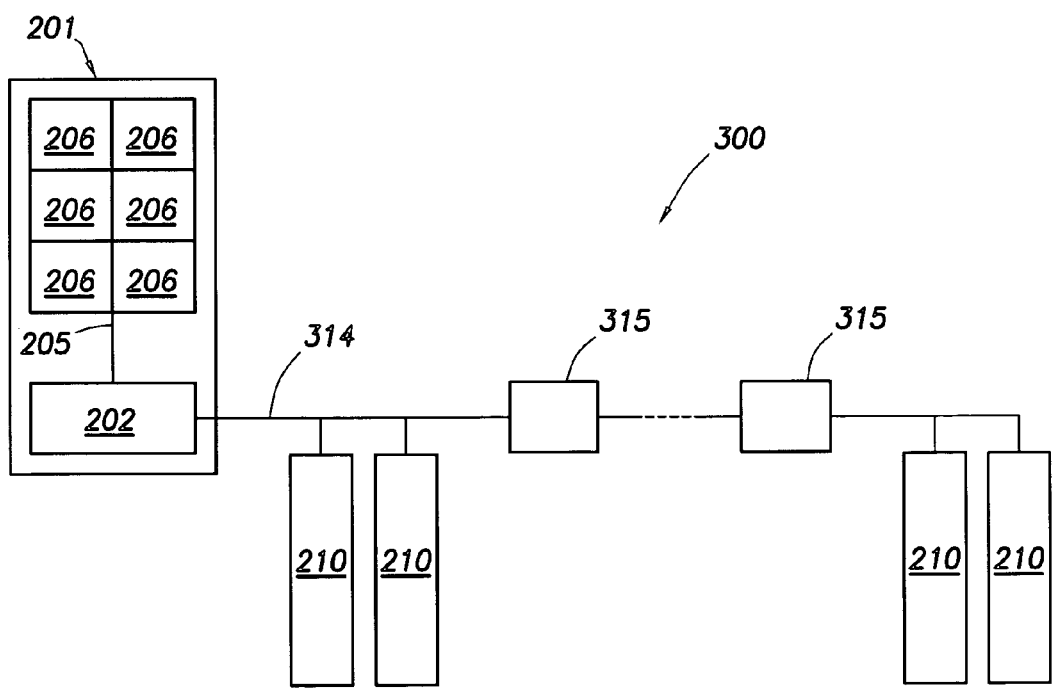
FIG. 3 schematically illustrates a block diagram showing an exemplary embodiment of a storage system including a controller mounted on an internal backplane having hardware devices such as HDD connected via a point-to-point link, according to teachings of the present disclosure.

As shown in FIGS. 2 and 3, for example, one or more computer components may be communicatively connected to the information handling system 110 via a bus 204, as described below in more detail, or through a point-to-point link 314. In some embodiments, the information handling system 110 may include a storage system 200 (described below in more detail) that uses a small computer system interface (SCSI), Fibre Channel, serial attached SCSI (SAS), and/or other standard for communications between components and/or devices and the system.

FIGS. 2 and 3 are block diagrams showing various exemplary embodiments of the storage system 200, including a small computer system interface (SCSI) storage subsystem 211 and a serial attached SCSI (SAS) storage subsystem 300, respectively. Each storage subsystem 200 may include a controller 202 mounted on an internal backplane 201 having hard disk drives (HDDs) 206. The SCSI storage subsystem 211 may further include a stand-alone enclosure 212 that may include input/output (I/O) expanders coupled to a controller 202 having additional SCSI devices such as the HDDs 210 connected via a SCSI bus 204. The SAS storage subsystem 300 may further include additional SAS devices such as the HDDs 210 interconnected via the point-to-point link 314. In various illustrative embodiments, the SAS storage subsystem 300 may further include one or more SAS expanders 315 that may be operable to regenerate, reshape, and/or retransmit a SAS signal to additional SAS devices such as the HDDs 210 interconnected via the point-to-point link 314.

A SCSI/SAS storage system such as storage system 200 may include a plurality of hardware and/or SCSI/SAS devices such as the internal hard disk drives (HDDs) 206 and the external hard disk drives (HDDs) 210 that are connected via I/O expanders. Other examples of SCSI/SAS devices may include tape drives (not expressly shown) and/or compact disk drives (not expressly shown).

The I/O expanders may allow the SCSI devices to connect to the storage system 200. The I/O expanders may include the SAS expanders 315 that may include expander chips (not expressly shown), the internal backplane 201 and/or the enclosure 212 that may have connections for the SCSI devices to communicate with the storage system 200 via a SCSI bus such as the internal bus 205 and the external bus 204. Useful exemplary enclosures 212 may include a Power-Vault 220 system and/or a PowerVault 210 system manufactured by Dell, Inc. Because the SCSI devices may reside at different locations and/or configurations within the storage system 200, the controller 202 may be used to direct communications to the address associated with each SCSI device.

The SAS storage subsystem 300 may further include one or more SAS expanders 315 that may be used to link and/or interconnect with one or more hardware devices such as the HDD 210. However, there may not necessarily be one SAS expander 315 for each hardware device such as the hard disk drive (HDD) 210.

Each hardware and/or SCSI device within the storage system 200 may be represented as a SCSI target. Each SCSI device may include an address for communications between a processor and memory (not expressly shown) in the storage system 200 via an I/O controller such as the controller 202 shown on the internal backplane 201. The controller 202 may direct information between the SCSI devices via the internal bus 205 and/or the external bus 204.

The connections on SCSI devices may be interchangeable such that an internal SCSI device such as the internal HDD 206 may be placed in the enclosure 212, having an I/O expander. Similarly, the external HDD 210 may connect to the internal backplane 201 in lieu of the internal HDD 206.

Even though the SCSI devices may physically connect at the different locations, compatibility issues may arise such as the SCSI device may not be supported. Thus, the controller 202 may perform a scan for devices placed on interconnections such as the bus 204 and the point-to-point link 314 for devices associated with storage system 200 to identify potential compatibility issues. For example, compatibility issues may arise between a combination of the SCSI controller and an SCSI hardware device, the SCSI controller and an attached enclosure, the enclosure and an SCSI device, and the SCSI device and another SCSI device. Furthermore, firmware compatibility issues may arise such as one or more of the devices may not have the most up-to-date revision of the appropriate respective firmware.

Figure 4:
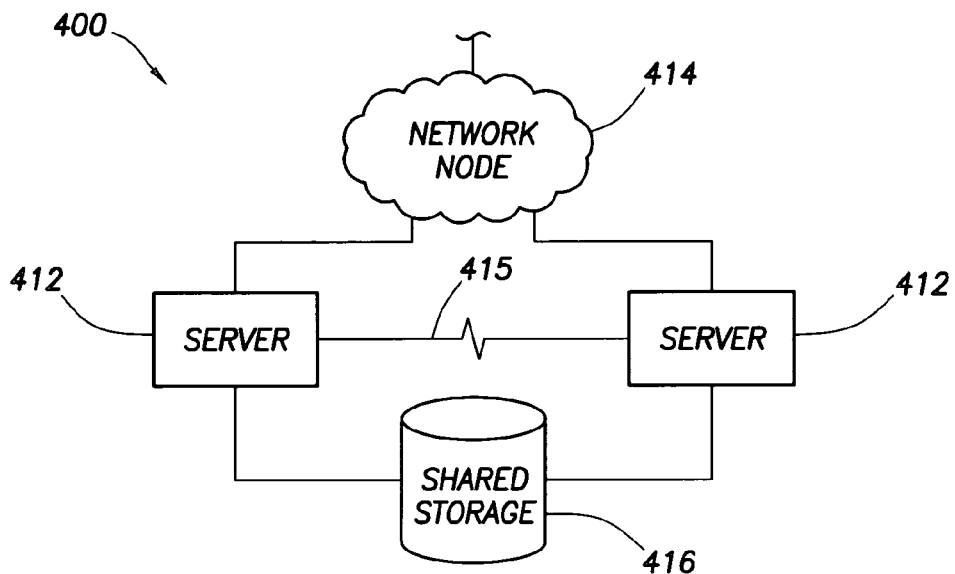
FIG. 4 schematically illustrates a block diagram of a server cluster network.
Figure 5:
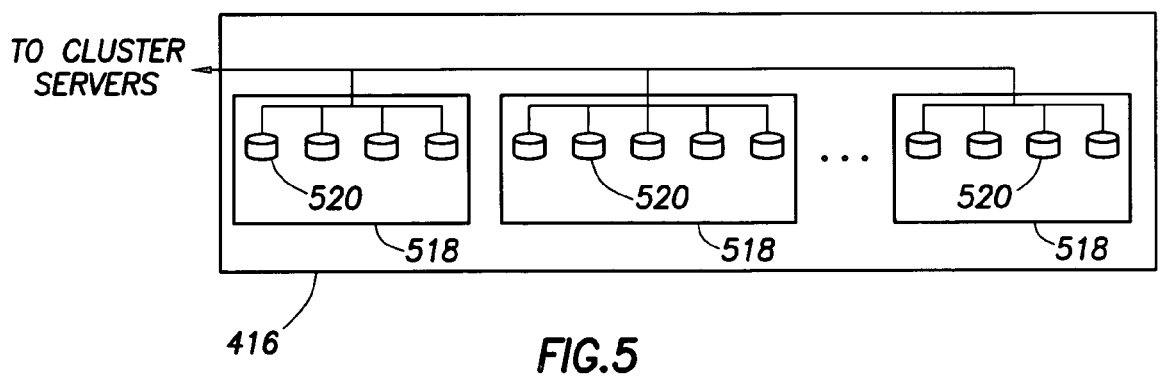
FIG. 5 schematically illustrates a block diagram of a shared storage unit.

Shown in FIG. 4 is an exemplary embodiment of a two-node server cluster network 400. The server cluster network 400 may include one or more server nodes 412 that may be interconnected to one another by a heartbeat or communications link 415. Each of the server nodes 412 may be coupled to a network node 414, which represents a connection to a communications network served by the server nodes 412. Each of the server nodes 412 may be coupled to a shared storage unit 416. Shown in FIG. 5 is a diagram of the shared storage unit 416, which may include a number of drive arrays 518. Each of the drive arrays 518 may include a number of interconnected storage disks or drives 520 that may be managed according to a fault tolerant data storage methodology, such as a redundant array of inexpensive disks (RAID) methodology. The shared storage unit 416 of FIG. 5 is shown as having three drive arrays 518, although other configurations of shared storage unit 416 may have more or fewer drive arrays 518.

Figure 6:
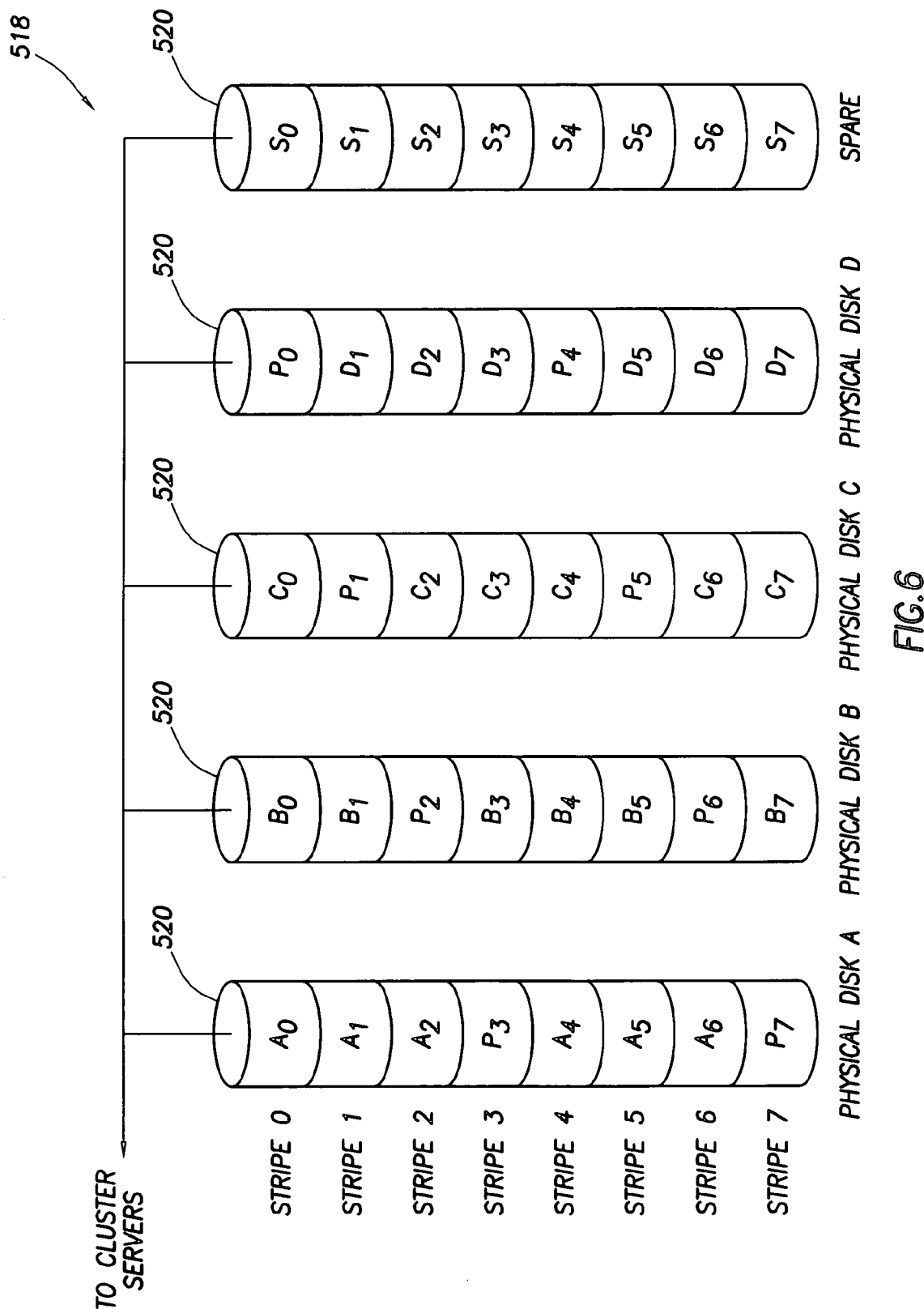
FIG. 6 schematically illustrates a diagram of a drive array.

The storage drives 520 of the drive array 518 may operate according to a RAID Level 5 data storage scheme. RAID Level 5 is characterized by the inclusion of a parity strip in each stripe of data as a method of protecting the data of the stripe and of providing for the ability to rebuild or restore the data of the stripe on the basis of the data stored on the remaining strips of data in the data stripe. Shown generally at 518 in FIG. 6 is a diagram of a drive array that may include five data drives 520, labeled Physical Disk A through Physical Disk D, and a spare disk. Each of the four data disk drives 520 in the example of FIG. 6 may includes eight stripes or rows of data, labeled Stripe 0 through Stripe 7. It should be recognized that the configuration of the RAID array 518 of FIG. 6 is an illustration and that an implementation of a RAID array 518 may have more or fewer disk drives 520 with more or fewer stripes or rows, and may be of a different RAID level. The size or width of each stripe of data may be, for example, 64 KB per disk.

With reference to Stripe 0, data $A_0$, $B_0$, and $C_0$ may be stored in Disk A, Disk B, and Disk C, respectively. The parity bits for Stripe 0, which may be the result of an exclusive-OR operation performed on the content of Stripe 0 in Disk A, Disk B, and Disk C, may be stored in Disk D and may be labeled $P_0$. As a second example of the data structure of the RAID array 518, with reference to Stripe 7, $B_7$, $C_7$, and $D_7$ may be stored in Disk B, Disk C, and Disk D, respectively. The parity bits for Stripe 7, which may be the result of an exclusive-OR operation performed on the content of Stripe 7 in Disk B, Disk C, and Disk D, may be stored in Disk A and may be labeled $P_7$. If, for example, Disk C were to fail or be replaced, the data in each stripe of Disk C would be rebuilt with the data in the other three disks of the RAID array 518.

The spare storage drive of RAID array 518 may likewise be arranged into a number of logical stripes that mirror the scheme used for the data or active storage drives 520. In this example, the spare storage drive may include seven stripes, labeled $S_0$-$S_7$. In normal operation, the spare storage drive is not used as part of the RAID Level 5 data storage scheme. Instead, the spare storage drive exists in the shared storage unit 416 (FIGS. 4 and 5) and can be associated with any one or more of the RAID arrays 518 for the sake of the firmware update process disclosed herein.

Figure 7:
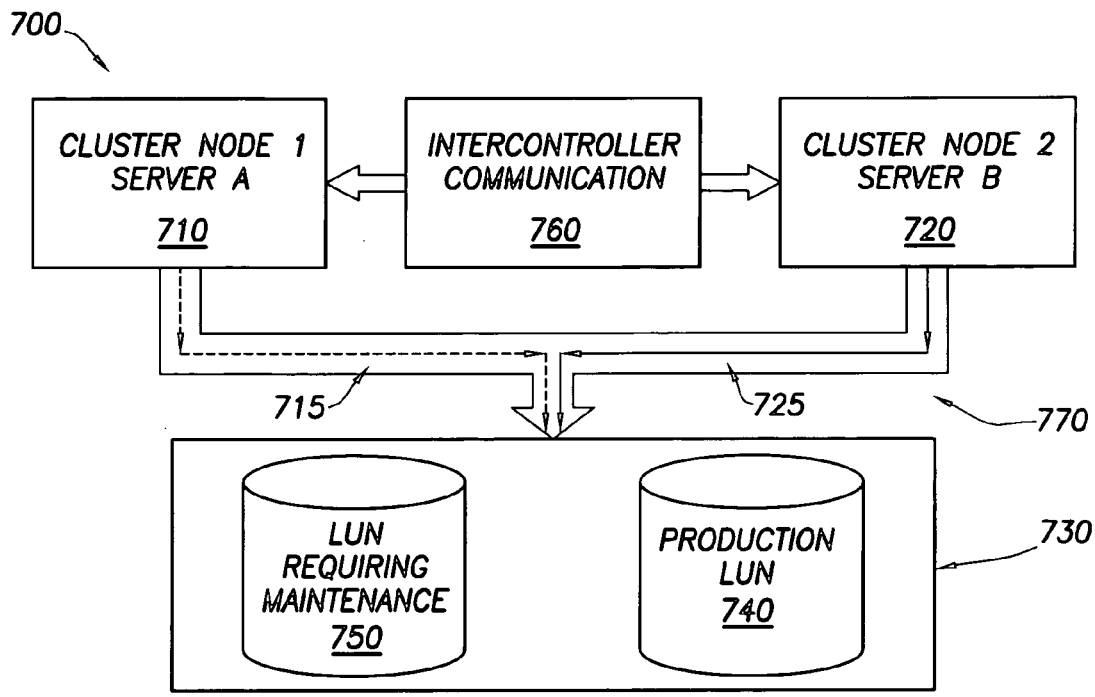
FIG. 7 schematically illustrates a diagram of a 2-node cluster.
Figure 11:
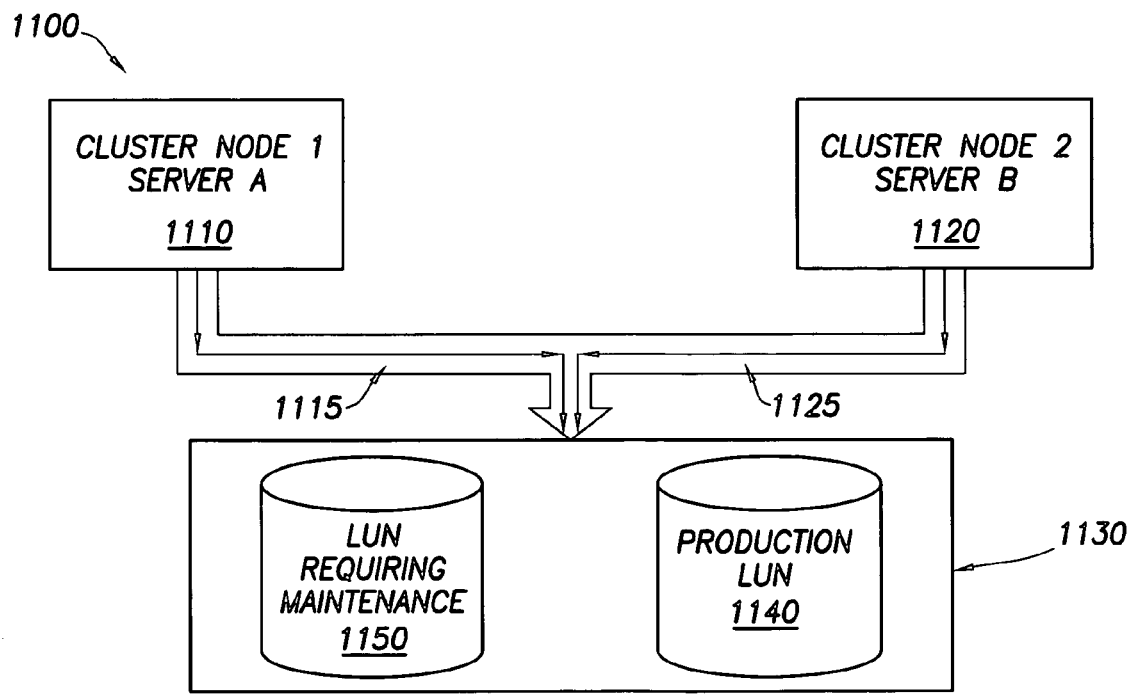
FIG. 11 schematically illustrates a diagram of a conventional 2-node cluster.

FIG. 7 schematically illustrates a 2-node cluster 700 based on SCSI, Fibre Channel, SAS, or any applicable technology, for example, with a cluster node (or server) A 710 and a cluster node (or server) B 720. Although only 2 nodes are shown in the 2-node cluster 700, any number N of nodes may be accommodated in a similar N-node cluster. The cluster node B 720 may be substantially busy accessing a logical unit number (LUN) of a storage system subunit 730, such as a production LUN 740, as indicated by arrows 725, while the cluster node A 710 may be substantially idle. The controller firmware on the cluster node A 710 may kick off low priority nonessential input/output (I/O) operations (NEIs) with a predetermined P % utilization, such as by accessing an LUN requiring maintenance 750 of the storage system subunit 730, as indicated by arrows 715, for example. In various illustrative embodiments, the predetermined P % utilization may be user configurable and may be such that P % is in a range of about 1% to about 90%. In various exemplary illustrative embodiments, the predetermined P % utilization may be user configurable and may be such that P % is in a range of about 1% to about 5%. In various particular illustrative embodiments, the predetermined P % utilization may be such that P % is about 5%, for example. As shown in FIG. 7, the controller on the cluster node A 710 may communicate, as indicated by intercontroller communication 760, with the controller on the cluster node B 720 periodically to determine the amount of maintenance and/or low priority NEIs 715 to send to the LUN requiring maintenance 750 of the storage system subunit 730, based on the storage system subunit 730 utilization by the controller on the cluster node B 720. For example, the intercontroller communication 760 between the controller on the cluster node A 710 may be achieved through an existing shared input/output bus 770 in the cluster 700.

Figure 8:
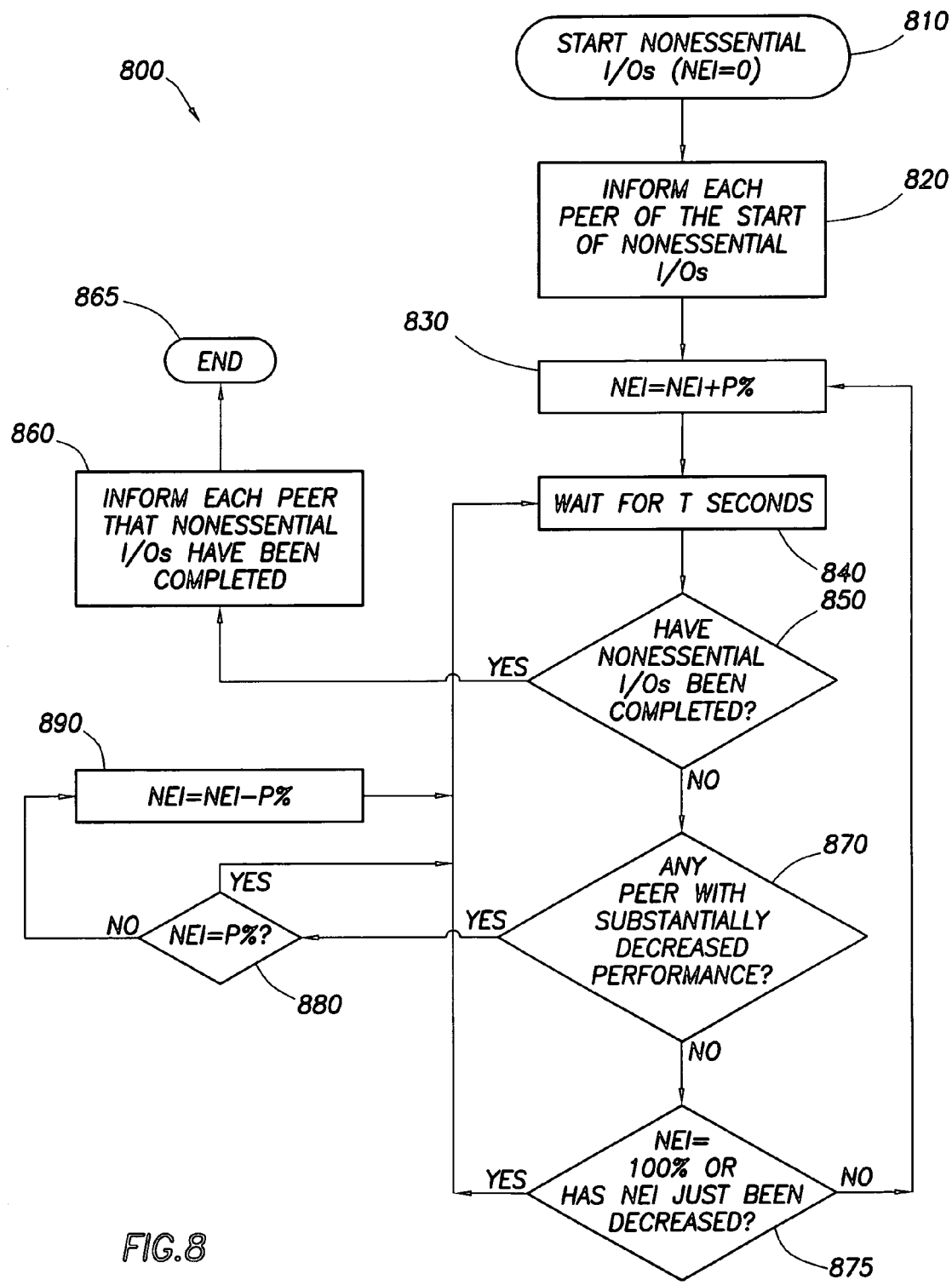
FIG. 8 schematically illustrates a flow chart for adaptive cluster input/output control for a node running nonessential input/output operations (NEIs), according to teachings of the present disclosure.

FIG. 8 schematically illustrates a flow chart of various exemplary embodiments of a method 800 for adaptive cluster input/output control. The method 800 starts, as indicated at 810, when the controller on the cluster node A 710, for example, may start the nonessential input/output (I/O) operations (NEIs) 715 with a low input/output (I/O) utilization percentage, initializing the NEI utilization percentage by setting NEI=0. As indicated at 820, each peer, such as the controller on the cluster node B 720, may be informed of the start of the nonessential input/output (I/O) operations (NEIs) 715 with the low input/output (I/O) utilization percentage. The NEI utilization percentage may be increased by a predetermined utilization percentage P %, NEI=NEI+P %, as indicated at 830. The controller on the cluster node A 710, for example, may wait for T seconds, as indicated at 840. In various illustrative embodiments, the predetermined amount of time T may be user configurable and may be in a range of about 1 second to about 600 seconds. In various exemplary illustrative embodiments, the predetermined amount of time T may be user configurable and may be in a range of about 5 seconds to about 100 seconds.

As indicated at 850, a determination may be made whether or not the low priority NEIs 715 have been completed. If the low priority NEIs 715 have been completed, each peer, such as the controller on the cluster node B 720, may be informed that the low priority NEIs 715 have been completed, as indicated at 860, and the method 800 may end, as indicated at 865. However, if the low priority NEIs 715 have not been completed, a determination may be made whether or not any peer, such as the controller on the cluster node B 720, may have experienced substantially decreased performance, such as substantially long input/output (I/O) response times and the like, as indicated at 870. If any peer has experienced substantially decreased performance, a determination may be made whether or not the NEI utilization percentage may be equal to the predetermined utilization percentage P %, NEI=P %, as indicated at 880. If the NEI utilization percentage is equal to the predetermined utilization percentage P %, NEI=P %, the controller on the cluster node A 710, for example, may go back and wait for another T seconds, as indicated at 840. If the NEI utilization percentage is greater than the predetermined utilization percentage P %, NEI>P %, the NEI utilization percentage may be decreased by the predetermined utilization percentage P %, NEI=NEI−P %, as indicated at 890, and the controller on the cluster node A 710, for example, may go back and wait for another T seconds, as indicated at 840.

If no peer, such as the controller on the cluster node B 720, has experienced substantially decreased performance, a determination may be made whether or not the NEI utilization percentage may be equal to 100%, NEI=100%, or whether or not the NEI utilization percentage may have just been decreased, as indicated at 875. For example, the NEI utilization percentage may have just been decreased if the most recent change to the NEI utilization percentage had been that the NEI utilization percentage had been decreased by the predetermined utilization percentage P %, NEI=NEI−P %, as indicated at 890. If the NEI utilization percentage is equal to 100%, NEI=100%, or if the NEI utilization percentage has just been decreased, the controller on the cluster node A 710, for example, may go back and wait for another T seconds, as indicated at 840. If the NEI utilization percentage is less than 100%, NEI<100%, and if the NEI utilization percentage has not just been decreased, the NEI utilization percentage may be increased again by the predetermined utilization percentage P %, NEI=NEI+P %, as indicated at 830, and the controller on the cluster node A 710, for example, may go back and wait for another T seconds, as indicated at 840. Note that if the result of increasing the NEI utilization percentage again by the predetermined utilization percentage P % would be greater than 100%, as might happen if P does not divide evenly into 100 without remainder, for example, then the NEI utilization percentage may be set at 100% so that the NEI utilization percentage would always be less than or equal to 100%. In various alternative illustrative embodiments, a maximum NEI utilization percentage other than 100% may be used. However, a maximum NEI utilization percentage of 100% may substantially maximize performance.

In various illustrative embodiments, the controller on the cluster node A 710, for example, may start the NEIs 715, while informing other peers, such as the controller on the cluster node B 720, about the NEIs 715. The controller on the cluster node A 710 may periodically receive feedback from the peers, such as the controller on the cluster node B 720, about the storage utilization of the peers, and the controller on the cluster node A 710 may adjust the amount of the NEIs 715 accordingly. If all the peers, such as the controller on the cluster node B 720, have low storage utilization, the controller on the cluster node A 710 may gradually increase the amount of the NEIs 715 until the amount of the NEIs 715 reaches 100%. If any of the peers, such as the controller on the cluster node B 720, observe input/output (I/O) performance problems, such as long I/O response time, the controller on the cluster node A 710 may gradually decrease the amount of the NEIs 715 until either all the peers, such as the controller on the cluster node B 720, are fine or until the amount of the NEIs 715 reaches a predetermined minimum. When the NEIs 715 have been completed and the nonessential operation task is done, the controller on the cluster node A 710 may inform all the peers, such as the controller on the cluster node B 720, so that the peers may stop sampling performance data.

Figure 9:
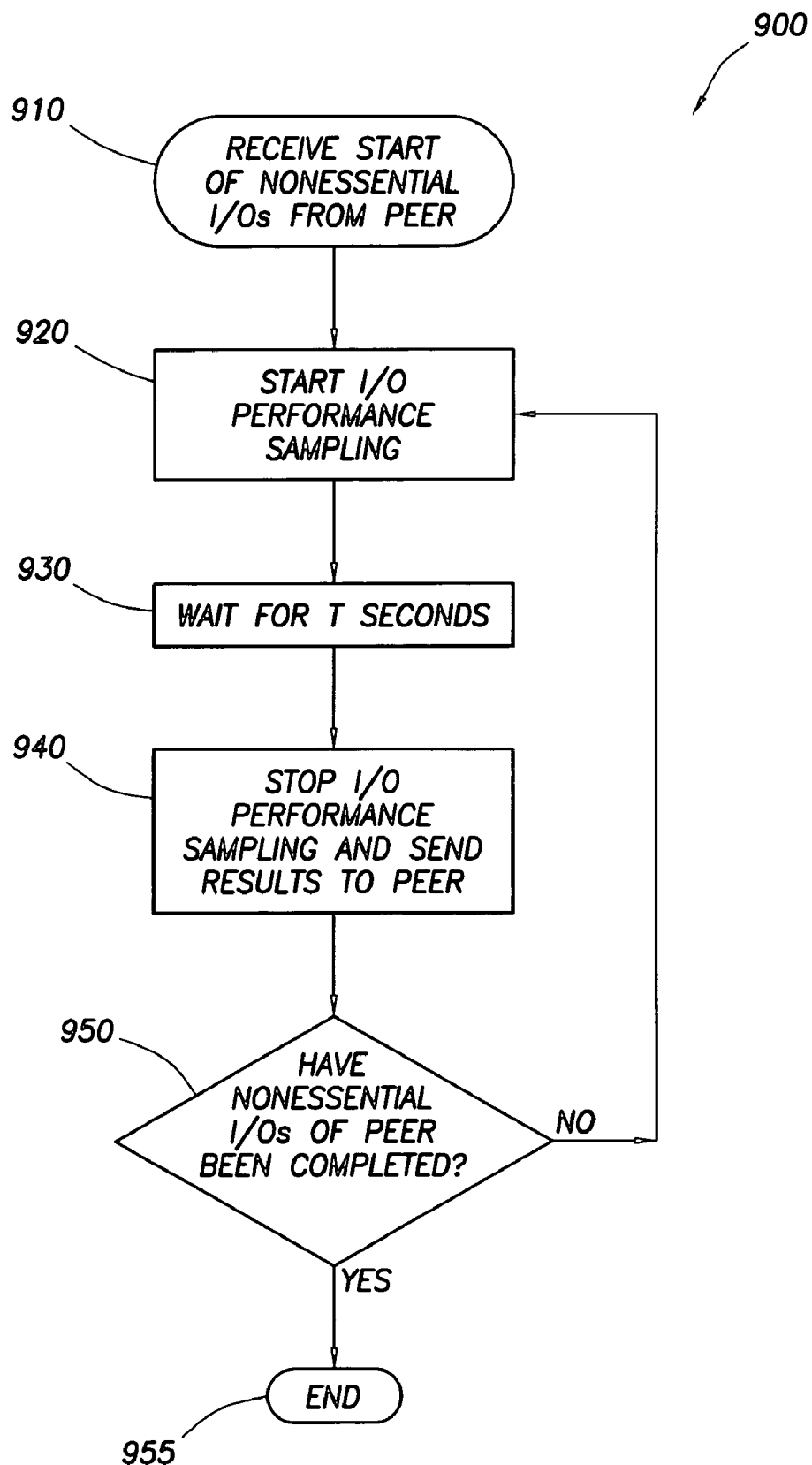
FIG. 9 schematically illustrates a flow chart for adaptive cluster input/output control for a peer node of a node running nonessential input/output operations (NEIs), according to teachings of the present disclosure.

FIG. 9 schematically illustrates a flow chart of various exemplary embodiments of a method 900 for adaptive cluster input/output control. The method 900 starts, as indicated at 910, when a peer, such as the controller on the cluster node B 720, receives information that the controller on the cluster node A 710, for example, may have started the nonessential input/output (I/O) operations (NEIs) 715 with the low input/output (I/O) utilization percentage. As indicated at 920, the peer, such as the controller on the cluster node B 720, may start input/output (I/O) performance sampling, for example, sampling the length of I/O response times and/or counting the number of outstanding I/O requests, and the like. The peer, such as the controller on the cluster node B 720, may wait for T seconds, as indicated at 930. In various illustrative embodiments, as described above, the predetermined amount of time T may be user configurable and may be in a range of about 1 second to about 600 seconds. In various exemplary illustrative embodiments, as also described above, the predetermined amount of time T may be user configurable and may be in a range of about 5 seconds to about 100 seconds. The peer, such as the controller on the cluster node B 720, may stop the input/output (I/O) performance sampling, and send the results of the input/output (I/O) performance sampling to the controller on the cluster node A 710, as indicated at 940.

As indicated at 950, a determination may be made whether or not the low priority NEIs 715 have been completed, based on the peer, such as the controller on the cluster node B 720, having received information that the controller on the cluster node A 710, for example, may have completed the nonessential input/output (I/O) operations (NEIs) 715. If the low priority NEIs 715 have been completed, the method 900 may end, as indicated at 955. However, if the low priority NEIs 715 have not been completed, the peer, such as the controller on the cluster node B 720, may again start input/output (I/O) performance sampling, as indicated at 920, and wait for another T seconds, as indicated at 930.

In various illustrative embodiments, upon receiving information about the start of the NEIs 715, each peer, such as the controller on the cluster node B 720, may periodically sample its own performance data, such as the number of outstanding I/O requests, the response time, and the like, and provide the initiating node, the controller on the cluster node A 710, for example, with the result of the performance sampling. Each peer, such as the controller on the cluster node B 720, may stop the process of performance sampling when the initiating node, the controller on the cluster node A 710, for example, signals the end of the NEIs 715. In various illustrative embodiments, the methods 800 and 900, for example, together may help maximize the performance of the cluster 700 environment and allow NEIs 715 only when the entire cluster 700 ecosystem has cycles. As described above, communication between the peer controllers, such as the controller on the cluster node A 710 and the controller on the cluster node B 720, may be achieved through the shared input/output bus 770 in the cluster 700.

Figure 10:
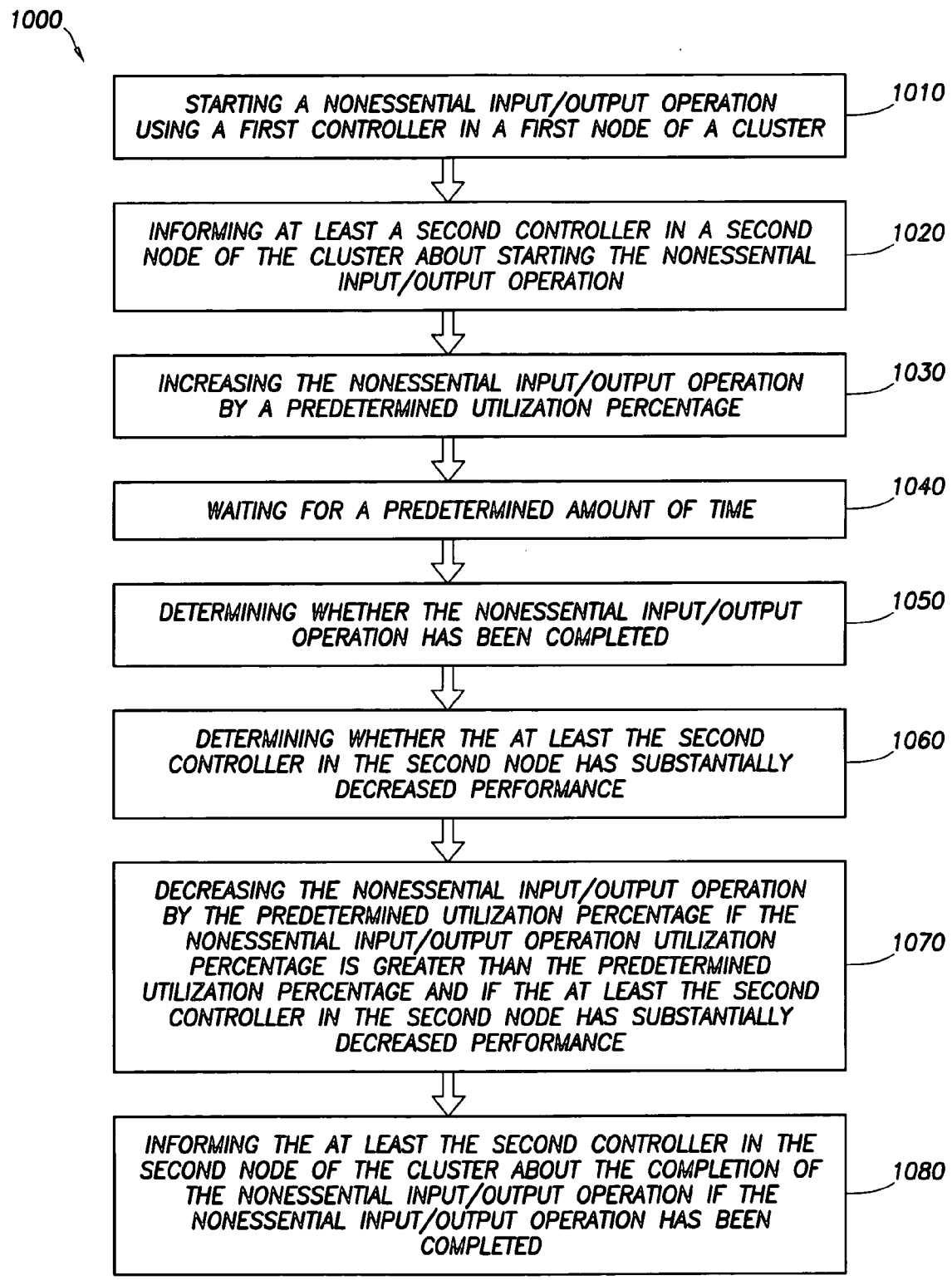
FIG. 10 schematically illustrates a method for adaptive cluster input/output control in an information handling system, according to teachings of the present disclosure.

In various illustrative embodiments, as shown in FIG. 10, a method 1000 for adaptive cluster input/output control in an information handling system may be provided. The method 1000 may comprise starting a nonessential input/output operation using a first controller in a first node of a cluster, as indicated at 1010, informing at least a second controller in a second node of the cluster about starting the nonessential input/output operation, as indicated at 1020, and increasing the nonessential input/output operation by a predetermined utilization percentage, as indicated at 1030. The method 1000 may also comprise waiting for a predetermined amount of time, as indicated at 1040, determining whether the nonessential input/output operation has been completed, as indicated at 1050, and determining whether the at least the second controller in the second node has substantially decreased performance, as indicated at 1060. The method 1000 may also comprise decreasing the nonessential input/output operation by the predetermined utilization percentage if the nonessential input/output operation utilization percentage is greater than the predetermined utilization percentage and if the at least the second controller in the second node has substantially decreased performance, as indicated at 1070, and informing the at least the second controller in the second node of the cluster about the completion of the nonessential input/output operation if the nonessential input/output operation has been completed, as indicated at 1080.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

Although various illustrative embodiments of the present invention and their advantages are described in detail, a person skilled in the art having the benefit of the present disclosure could make various alterations, additions, and/or omissions without departing from the spirit and scope of the present invention, as defined by the appended claims.

What is claimed is:

1. A method for adaptive cluster input/output control, the method comprising:
    starting a nonessential input/output operation using a first controller in a first node of a cluster;
    informing at least a second controller in a second node of the cluster about starting the nonessential input/output operation;
    increasing the nonessential input/output operation by a predetermined utilization percentage;
    waiting for a predetermined amount of time;
    determining whether the nonessential input/output operation has been completed;
    determining whether the at least the second controller in the second node has substantially decreased performance if the nonessential input/output operation has not been completed;
    wherein determining whether the at least the second controller in the second node has substantially decreased performance further comprises:
        receiving information from the first controller in the first node at the at least the second controller in the second node about the first controller in the first node of the cluster starting the nonessential input/output operation;
        starting a sampling of an input/output performance at the at least the second controller in the second node;
        waiting for the predetermined amount of time;
        stopping the sampling of the input/output performance at the at least the second controller in the second node and sending results of the sampling of the input/output performance to the first controller in the first node; and
        determining whether the nonessential input/output operation has been completed;
        decreasing the nonessential input/output operation by the predetermined utilization percentage if the nonessential input/output operation utilization percentage is greater than the predetermined utilization percentage and if the at least the second controller in the second node has substantially decreased performance; and
        informing the at least the second controller in the second node of the cluster about the completion of the nonessential input/output operation if the nonessential input/output operation has been completed.

2. The method of claim 1, further comprising:
    determining at least one of whether the nonessential input/output operation utilization percentage is a maximum and whether the nonessential input/output operation utilization percentage has just been decreased.

3. The method of claim 2, further comprising:
    waiting for the predetermined amount of time if at least one of the nonessential input/output operation utilization percentage is the maximum, the nonessential input/output operation utilization percentage has just been decreased, and the nonessential input/output operation utilization percentage is equal to the predetermined utilization percentage.

4. The method of claim 3, further comprising:
    increasing the nonessential input/output operation by the predetermined utilization percentage if at least one of the nonessential input/output operation utilization percentage is less than the maximum and the nonessential input/output operation utilization percentage has not just been decreased.

5. The method of claim 1, wherein determining whether the at least the second controller in the second node has substantially decreased performance further comprises:
    starting a next sampling of an input/output performance at the at least the second controller in the second node if the nonessential input/output operation has not been completed; waiting for the predetermined amount of time; and stopping the next sampling of the input/output performance at the at least the second controller in the second node and sending results of the sampling of the input/output performance to the first controller in the first node.

6. The method of claim 2, wherein determining whether the at least the second controller in the second node has substantially decreased performance further comprises:
    receiving information from the first controller in the first node at the at least the second controller in the second node about the first controller in the first node of the cluster starting the nonessential input/output operation;
    starting a sampling of an input/output performance at the at least the second controller in the second node;
    waiting for the predetermined amount of time; stopping the sampling of the input/output performance at the at least the second controller in the second node and sending results of the sampling of the input/output performance to the first controller in the first node;
    determining whether the nonessential input/output operation has been completed;
    starting a next sampling of an input/output performance at the at least the second controller in the second node if the nonessential input/output operation has not been completed;
    waiting for the predetermined amount of time; and
    stopping the next sampling of the input/output performance at the at least the second controller in the second node and sending results of the sampling of the input/output performance to the first controller in the first node.

7. The method of claim 3, wherein determining whether the at least the second controller in the second node has substantially decreased performance further comprises:
    receiving information from the first controller in the first node at the at least the second controller in the second node about the first controller in the first node of the cluster starting the nonessential input/output operation;
    starting a sampling of an input/output performance at the at least the second controller in the second node;
    waiting for the predetermined amount of time; stopping the sampling of the input/output performance at the at least the second controller in the second node and sending results of the sampling of the input/output performance to the first controller in the first node;
    determining whether the nonessential input/output operation has been completed;

starting a next sampling of an input/output performance at the at least the second controller in the second node if the nonessential input/output operation has not been completed;

waiting for the predetermined amount of time; and stopping the next sampling of the input/output performance at the at least the second controller in the second node and sending results of the sampling of the input/output performance to the first controller in the first node.

8. The method of claim 4, wherein determining whether the at least the second controller in the second node has substantially decreased performance further comprises:

receiving information from the first controller in the first node at the at least the second controller in the second node about the first controller in the first node of the cluster starting the nonessential input/output operation;

starting a sampling of an input/output performance at the at least the second controller in the second node;

waiting for the predetermined amount of time; stopping the sampling of the input/output performance at the at least the second controller in the second node and sending results of the sampling of the input/output performance to the first controller in the first node;

determining whether the nonessential input/output operation has been completed;

starting a next sampling of an input/output performance at the at least the second controller in the second node if the nonessential input/output operation has not been completed; waiting for the predetermined amount of time; and stopping the next sampling of the input/output performance at the at least the second controller in the second node and sending results of the sampling of the input/output performance to the first controller in the first node.

9. A method for adaptive cluster input/output control, the method comprising:

starting a nonessential input/output operation using a first controller in a first node of a cluster;

informing at least a second controller in a second node of the cluster about starting the nonessential input/output operation;

increasing the nonessential input/output operation by a predetermined utilization percentage;

waiting for a predetermined amount of time; determining whether the nonessential input/output operation has been completed;

determining whether the at least the second controller in the second node has substantially decreased performance if the nonessential input/output operation has not been completed;

determining at least one of whether the nonessential input/output operation utilization percentage is a maximum and whether the nonessential input/output operation utilization percentage has just been decreased;

determining whether the nonessential input/output operation utilization percentage is equal to the predetermined utilization percentage;

decreasing the nonessential input/output operation by the predetermined utilization percentage if the nonessential input/output operation utilization percentage is greater than the predetermined utilization percentage and if the at least the second controller in the second node has substantially decreased performance;

waiting for the predetermined amount of time if at least one of the nonessential input/output operation utilization percentage is the maximum, the nonessential input/output operation utilization percentage has just been decreased, and the nonessential input/output operation utilization percentage is equal to the predetermined utilization percentage;

increasing the nonessential input/output operation by the predetermined utilization percentage if at least one of the nonessential input/output operation utilization percentage is less than the maximum and the nonessential input/output operation utilization percentage has not just been decreased; and informing the at least the second controller in the second node of the cluster about the completion of the nonessential input/output operation if the nonessential input/output operation has been completed.

10. The method of claim 9, wherein determining whether the at least the second controller in the second node has substantially decreased performance further comprises:

receiving information from the first controller in the first node at the at least the second controller in the second node about the first controller in the first node of the cluster starting the nonessential input/output operation;

starting a sampling of an input/output performance at the at least the second controller in the second node;

waiting for the predetermined amount of time; stopping the sampling of the input/output performance at the at least the second controller in the second node and sending results of the sampling of the input/output performance to the first controller in the first node; and determining whether the nonessential input/output operation has been completed.

11. The method of claim 10, wherein determining whether the at least the second controller in the second node has substantially decreased performance further comprises:

starting a next sampling of an input/output performance at the at least the second controller in the second node if the nonessential input/output operation has not been completed;

waiting for the predetermined amount of time; and stopping the next sampling of the input/output performance at the at least the second controller in the second node and sending results of the sampling of the input/output performance to the first controller in the first node.

12. The method of claim 9, wherein increasing the nonessential input/output operation by the predetermined utilization percentage further comprises increasing the nonessential input/output operation by the predetermined utilization percentage P % in a range of about 1% to about 90%.

13. The method of claim 10, wherein increasing the nonessential input/output operation by the predetermined utilization percentage further comprises increasing the nonessential input/output operation by the predetermined utilization percentage P % in a range of about 1% to about 90%.

14. The method of claim 11, wherein increasing the nonessential input/output operation by the predetermined utilization percentage further comprises increasing the nonessential input/output operation by the predetermined utilization percentage P% in a range of about 1% to about 90%.

15. The method of claim 9, wherein waiting for the predetermined amount of time further comprises waiting for the predetermined amount of time T in a range of about 1 second to about 600 seconds.

16. The method of claim 10, wherein waiting for the predetermined amount of time further comprises waiting for the predetermined amount of time T in a range of about 1 second to about 600 seconds.

17. The method of claim 11, wherein waiting for the predetermined amount of time further comprises waiting for the predetermined amount of time T in a range of about 1 second to about 600 seconds.

18. A method for adaptive cluster input/output control, the method comprising:

starting a nonessential input/output operation using a first controller in a first node of a cluster;

informing at least a second controller in a second node of the cluster about starting the nonessential input/output operation;

increasing the nonessential input/output operation by a predetermined utilization percentage P % in a range of about 1% to about 90%;

waiting for a predetermined amount of time T in a range of about 1 second to about 600 seconds;

determining whether the nonessential input/output operation has been completed; determining whether the at least the second controller in the second node has substantially decreased performance if the nonessential input/output operation has not been completed;

determining at least one of whether the nonessential input/output operation utilization percentage is a maximum and whether the nonessential input/output operation utilization percentage has just been decreased;

determining whether the nonessential input/output operation utilization percentage is equal to the predetermined utilization percentage;

decreasing the nonessential input/output operation by the predetermined utilization percentage if the nonessential input/output operation utilization percentage is greater than the predetermined utilization percentage and if the at least the second controller in the second node has substantially decreased performance;

waiting for the predetermined amount of time if at least one of the nonessential input/output operation utilization percentage is the maximum, the nonessential input/output operation utilization percentage has just been decreased, and the nonessential input/output operation utilization percentage is equal to the predetermined utilization percentage;

increasing the nonessential input/output operation by the predetermined utilization percentage if at least one of the nonessential input/output operation utilization percentage is less than the maximum and the nonessential input/output operation utilization percentage has not just been decreased; and informing the at least the second controller in the second node of the cluster about the completion of the nonessential input/output operation if the nonessential input/output operation has been completed, wherein determining whether the at least the second controller in the second node has substantially decreased performance further comprises:

receiving information from the first controller in the first node at the at least the second controller in the second node about the first controller in the first node of the cluster starting the nonessential input/output operation;

starting a sampling of an input/output performance at the at least the second controller in the second node;

waiting for the predetermined amount of time; stopping the sampling of the input/output performance at the at least the second controller in the second node and sending results of the sampling of the input/output performance to the first controller in the first node; and determining whether the nonessential input/output operation has been completed.

19. The method of claim 18, wherein determining whether the at least the second controller in the second node has substantially decreased performance further comprises:

starting a next sampling of an input/output performance at the at least the second controller in the second node if the nonessential input/output operation has not been completed;

waiting for the predetermined amount of time; and stopping the next sampling of the input/output performance at the at least the second controller in the second node and sending results of the sampling of the input/output performance to the first controller in the first node.

* * * * *